April 2, 1929.  G. A. WOODY  1,707,422
COUPLING
Filed May 8, 1926
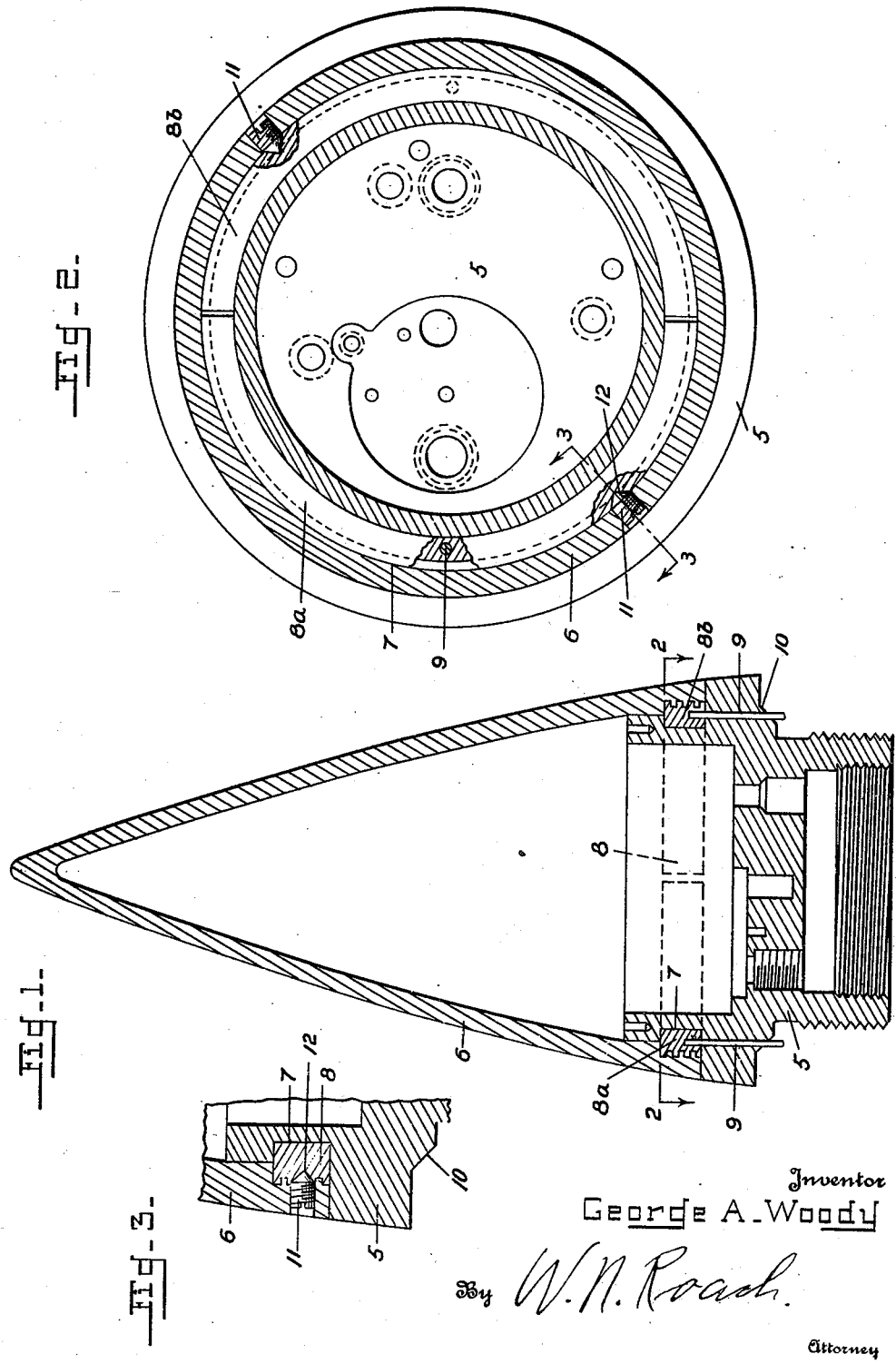

Patented Apr. 2, 1929.

1,707,422

UNITED STATES PATENT OFFICE.

GEORGE A. WOODY, OF UNITED STATES ARMY, PHILADELPHIA, PENNSYLVANIA.

COUPLING.

Application filed May 8, 1926. Serial No. 107,740.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

The subject of this invention is a coupling for removably connecting a setting cap to the base of a mechanical time fuse.

The principal object of the present invention is the provision of a combined locking and friction ring which will permit the removal of the setting cap from the fuse base without disarranging or damaging the mechanism.

With these and other objects in view which will appear as the description proceeds, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a longitudinal sectional view through a fuse housing showing my improved coupling;

Fig. 2 is a sectional view on the line 2—2 of Fig. 1; and

Fig. 3 is a sectional view on the line 3—3 of Fig. 2.

The fuse housing may be of any type comprising a base 5 and a rotatable setting cap 6. The base is provided with an annular groove 7 in which is placed my combined locking and friction ring 8 which preferably comprises semi-circular segments $8^a$—$8^b$ of a resilient metal. This ring is threaded for removable attachment of the setting cap and in order to hold the segments against turning during assembling they are fixed by means of one or more removable pins 9 inserted from the under side of the seat 10 of the base and projecting into recesses in the segments. As shown the holding pins centrally engage the segments but a single pin could be placed between the segments to produce the same result or the pins could be radially disposed.

For the purpose of varying the pressure exerted by the ring against the base and thus to adjust the relative freedom of movement between the setting cap and base there are provided set screws 11 insertable through the setting cap and engageable in a prepared recess 12 in the segments. While I have only shown one screw for each segment it is apparent that an additional screw may be provided to bear against the segment if it is desired to distribute the pressure over a greater area.

In assembling the fuse housing the segments $8^a$ and $8^b$ of the locking ring are placed in the groove 7 and fixed by means of the pins 9. The setting cap is then threaded to the ring and with the fuse mechanism set at safety the screws 11 are placed in position to bind the cap against movement. This insures absolute safety during storage and transportation and when the fuse is to be used the screws may be loosened to adjust the frictional resistance to the desired degree.

I claim:

1. A coupling for a fuse housing embodying a fuse base formed with an annular groove, a setting cap rotatably mounted thereon, a combined locking and friction ring comprising a plurality of segments located in the groove and adapted for threaded attachment of the cap, means for holding the segments against turning and screws inserted in the cap and bearing against the segments to adjustably regulate the frictional pressure of the segments on the base.

2. A coupling for fuse housings, embodying a fuse base provided with a groove, a setting cap rotatably mounted thereon, a segmental ring located in the groove and adapted for threaded attachment of the cap, means for holding the ring against turning and means for adjusting the frictional resistance between the ring and the base.

3. In a fuse housing, a base provided with an annular groove, a setting cap rotatably mounted on the base, a locking ring located in the groove and formed for threaded attachment of the cap and means operable from a position externally of the housing for regulating the frictional resistance between the ring and the fuse base.

GEORGE A. WOODY.